(12) United States Patent
Okamura

(10) Patent No.: US 6,834,800 B2
(45) Date of Patent: Dec. 28, 2004

(54) MERCHANDISE INVENTORY MANAGEMENT SYSTEM

(75) Inventor: Eiji Okamura, Tokyo (JP)

(73) Assignee: Leading Information Technology, Inc., Tokyo (JP)

( * ) Notice: Subject to any disclaimer, the term of this patent is extended or adjusted under 35 U.S.C. 154(b) by 106 days.

(21) Appl. No.: 10/184,011

(22) Filed: Jun. 26, 2002

(65) Prior Publication Data

US 2003/0015586 A1 Jan. 23, 2003

(30) Foreign Application Priority Data

Jun. 26, 2001 (JP) ........................................ 2001-193785

(51) Int. Cl.[7] .............................................. G06F 17/60
(52) U.S. Cl. ...................................... 235/385; 235/383
(58) Field of Search ................................. 235/385, 380, 235/381, 435, 383

(56) References Cited

U.S. PATENT DOCUMENTS

| | | | | |
|---|---|---|---|---|
| 4,881,061 A | * | 11/1989 | Chambers ................. | 340/572.1 |
| 5,745,036 A | * | 4/1998 | Clare ....................... | 340/572.1 |
| 5,777,884 A | * | 7/1998 | Belka et al. ................. | 700/225 |
| 6,195,006 B1 | * | 2/2001 | Bowers et al. ........... | 340/572.1 |
| 6,496,112 B1 | * | 12/2002 | Vega ....................... | 340/572.1 |
| 6,549,891 B1 | * | 4/2003 | Rauber et al. ................ | 705/28 |

* cited by examiner

Primary Examiner—Karl D. Frech
Assistant Examiner—Daniel A. Hess

(57) ABSTRACT

An employee theft control system includes a merchandise control ID tag 121 that is attached to an article and stores merchandise identification data, a personal ID tag 120 that stores data that identifies an employee and has a storage area into which merchandise identification data can be written and read from which said data can be read, a read/write device 109 that reads data from and writes data into the merchandise control ID tag 121 and the personal ID tag 120, and a verification device 100 that verifies the merchandise identification data read out from the merchandise control ID tag 121 and the personal ID tag 120 by the read/write device 109. At the location from which merchandise is to be removed, the merchandise identification data is read out from the merchandise control ID tag 121 on the merchandise to be removed by the employee and stored in the personal ID tag 120; and at the location into which the merchandise is to be brought in, the merchandise identification data is read from the merchandise control ID tag 121 on the merchandise to be brought in by the employee and the merchandise identification data stored in the personal ID tag 121 is read, which are then verified against each other.

7 Claims, 6 Drawing Sheets

MERCHANDISE INVENTORY MANAGEMENT SYSTEM

TECHNICAL FIELD

The present invention relates to a merchandise inventory management system that manages merchandise inventory by reading out both merchandise tags and a personnel tag.

BACKGROUND

When selling apparel, jewelry, shoes, handbags, wallets, and other merchandise, it is necessary to maintain a large number of sizes, colors, and the like of merchandise on hand in order to immediately meet customer demands.

However, because the display of a large quantity of a large number of different types of merchandise does not allow an aesthetically pleasing display, much of the merchandise stock is normally kept in a stockroom. In addition, with high fashion merchandise, because it is necessary to immediately satisfy the merchandise customer's desire within the relatively short time frame in which the desire to purchase it remains, merchandise is either kept in a stockroom inside the retail shop or in a stockroom adjacent thereto, and a number of employees remove the merchandise from and add merchandise to the stockroom in accordance with customer demands.

Moreover, because a number of employees remove these articles from and add articles to the stockroom in accordance with customer demands, the task of accounting for the articles becomes arduous. And when employees remove articles from the stockroom based on customer demands, it is difficult to keep track of who removed what.

However, because only a limited amount of time is available for moving an article from the stockroom to the location requested by a customer based on his or her demand, it is not possible to spend much time for inventory management.

On the other hand, any attempt to remove articles from and bring articles into a stockroom quickly will typically result in less reliable inventory management. Therefore, the removal and return of articles must always be accurately conducted, and thus inventory management and the management of the removal and return of articles are important and burdensome issues for a retail store.

Because of this, a control method has been proposed in the past that produces a removal voucher when an article is being removed, and uses the removal voucher at the spot where the article is brought back in to determine if the information on the removal voucher matches the article being brought in. An article removal control system has also been proposed that uses theft prevention tags.

As shown in FIG. 7, a conventional merchandise inventory management system is comprised of a theft prevention tag 10 that is attached to merchandise, loop antennas 4, a theft prevention tag reading device 11, and an alarm device 12. When the theft prevention tag 10 is passing through an aisle 1, which is surrounded by wall surfaces 2 in which the theft prevention tag reading device is installed, the system detects the theft prevention tag 10, issues an alarm by means of the alarm device 12, warning of an unauthorized removal.

A conventional merchandise inventory management system constructed in this manner issues an alarm only when an article with its theft prevention tag intact is being removed from the premises.

With a conventional merchandise inventory management system constructed in this manner, a theft prevention tag is attached to merchandise in order to deal with the problem of shoplifting merchandise out of the store, and a device that detects the theft prevention tag at the entrance/exit of the store is provided. During normal sale of merchandise, the theft prevention tag is removed at the cash register.

On the other hand, when a number of store employees remove articles from and add articles to a stockroom inside a store or adjacent thereto in accordance with customer demands, these removals are handled as legitimate.

However, in this situation, the theft prevention tag will be removed, and the person handling the merchandise cannot be identified. Even when a conventional theft prevention tag is used, there is a problem in that it is not possible to clearly assign the responsibility for the merchandise to anybody after it leaves the stockroom because the person removing the merchandise cannot be identified.

In addition, with the method of using a removal voucher, it takes time and effort to produce the voucher and to confirm that the merchandise removed and the merchandise brought in are the same, as a result making the customer wait.

BRIEF SUMMARY OF INVENTION

One objective of the present invention is to provide an improved merchandise inventory management system that discourages theft during the transportation of merchandise and the like by automatically recording and verifying the person removing the merchandise and the merchandise being removed.

Such a merchandise inventory management system preferably comprises a merchandise control ID tag that is attached to merchandise and stores merchandise identification data, a personal ID tag that stores data that identifies an employee and has a storage area into which the aforementioned merchandise identification data can be written and from which said data can be read, a read/write device that reads data from and writes into the aforementioned merchandise control ID tag and personal ID tag, and a verification device that verifies the merchandise identification data read out from the aforementioned merchandise control ID tag and personal ID tag by the read/write device; wherein at the location from which merchandise is to be removed, the merchandise identification data is read out from the merchandise control ID tag on the merchandise to be removed by the employee and stored in the personal ID tag; and at the location into which the merchandise is to be brought in, the merchandise identification data is read from the merchandise control ID tag on the merchandise to be brought in by the employee and the merchandise identification data stored in the personal ID tag is read, which are then verified against each other.

BRIEF DESCRIPTION OF THE DRAWINGS

Exemplary embodiments of the present invention will be described below based upon the appended figures, in which.

DETAILED DESCRIPTION OF EXEMPLARY EMBODIMENTS

Figure 1:
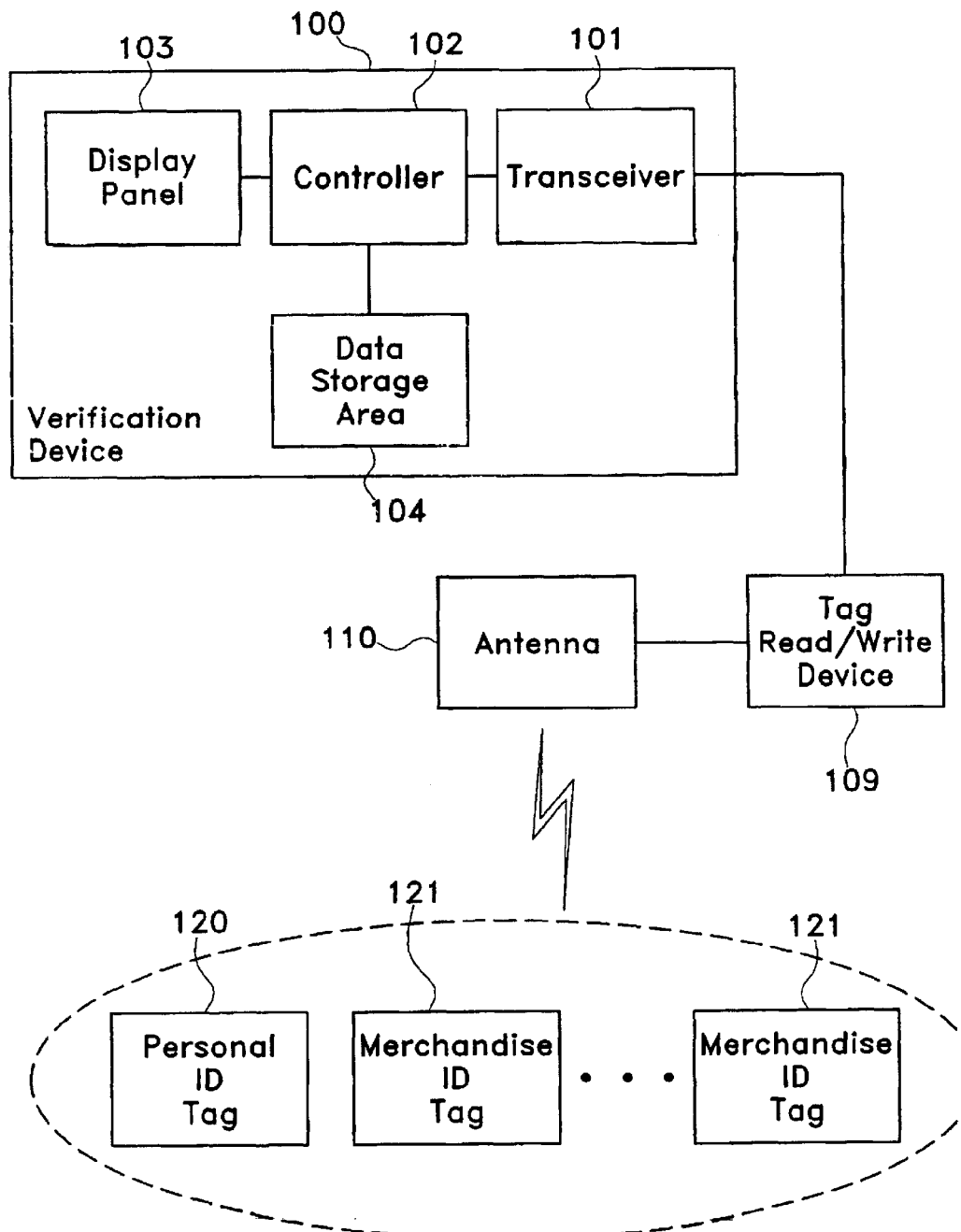
FIG. 1 shows the construction of a first embodiment of a merchandise inventory management system.

FIG. 1 is a structural view of a first embodiment of the present invention, illustrating a merchandise inventory management system that confirms the merchandise to be removed by a handler when the handler is at the entrance/exit of a stockroom in which the merchandise to be removed exists, and employs a verification device that confirms that all of the merchandise has been brought to the intended destination.

Figure 4:
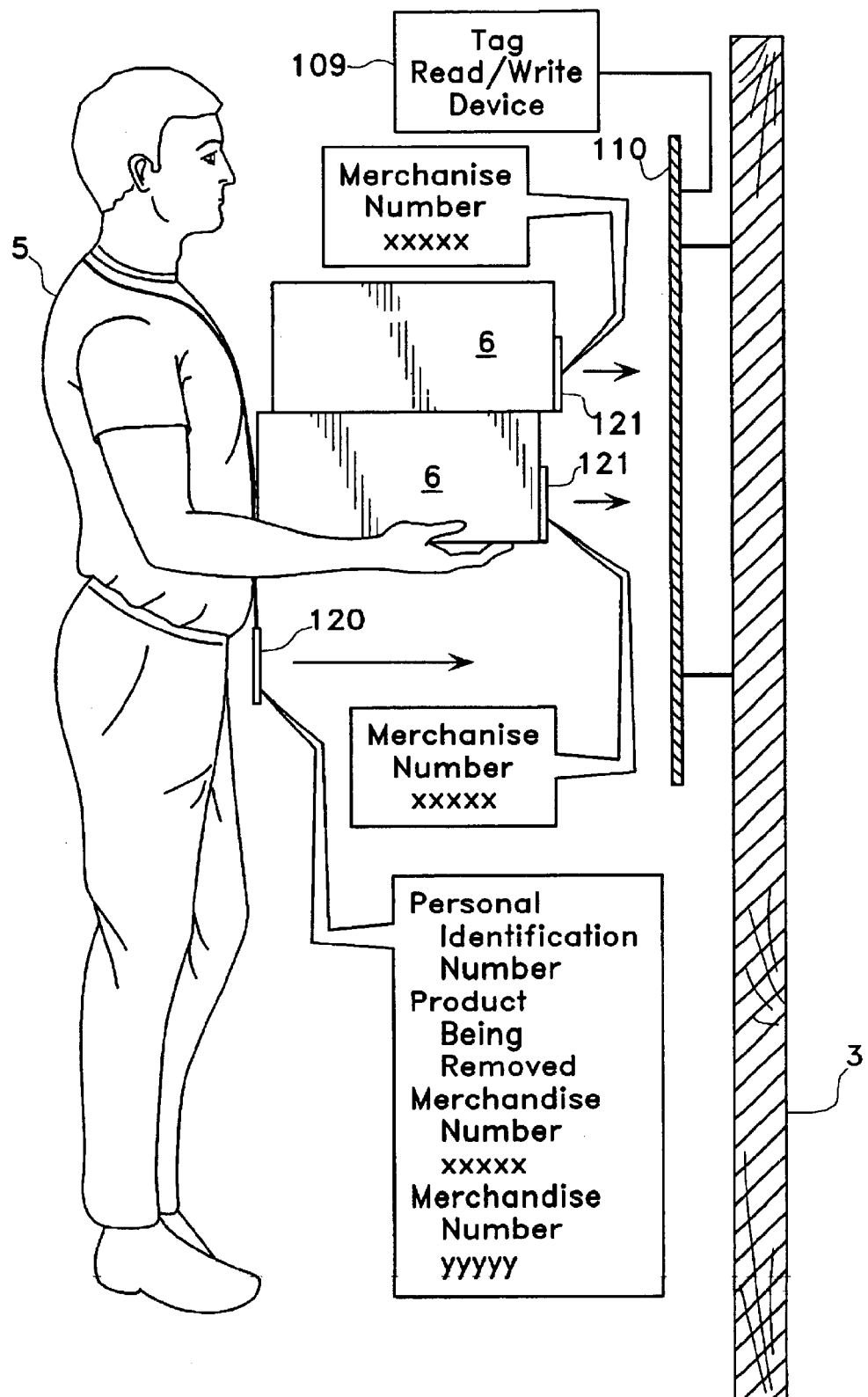
FIG. 4 depicts an exemplary process in which non-contact IC tags are being read out.

As shown in FIG. 4, a handler 5 is wearing a personal ID tag 120 containing his or her identity on his or her chest area, and is removing merchandise/products (hereinafter simply referred to as merchandise). Merchandise control ID tags 121 are either attached to the merchandise or contained in the package, and merchandise identification data that shows at least a merchandise number or product number is stored in the merchandise control tag 121.

In addition, the personal ID tag 120 is a non-contact wireless IC tag having a region that can be read from and written to and stores at least an employee number (personal identification number). At the location from which merchandise is to be removed, the personal ID tag 120 stores the merchandise number read out from the merchandise being removed, and these types of information can be read out as necessary.

A non-contact wireless IC tag read/write device 109 (hereinafter, referred to as a tag read/write device) works in cooperation with a non-contact wireless tag read out antenna 110, communicates with the personal ID tag 120 and the merchandise control ID tag 121, reads out and overwrites stored data, and communicates with a transceiver 101 of a verification device 100.

A controller 102 controls both the reading and writing of the personal ID tag 120 and the merchandise control ID tag 121, and outputs the results to a display panel 103.

A data storage area 104 associates the personal identification number read out with the attached merchandise number, and logs this information along with the time at which this processing took place. The data storage area 104 is normally constructed with a memory means such as a hard disk or flash memory device.

After the information is read from the personal ID tag and the merchandise control ID tag 121, the display panel 103 displays the results of writing the merchandise number into the personal ID tag 120, as well as the verification result. In addition, by manipulating these pieces of data, a manager can verify the log data.

Normally, the verification device 100 consists of a personal computer that is connected to and communicates with the tag read/write device 109.

Figure 3:
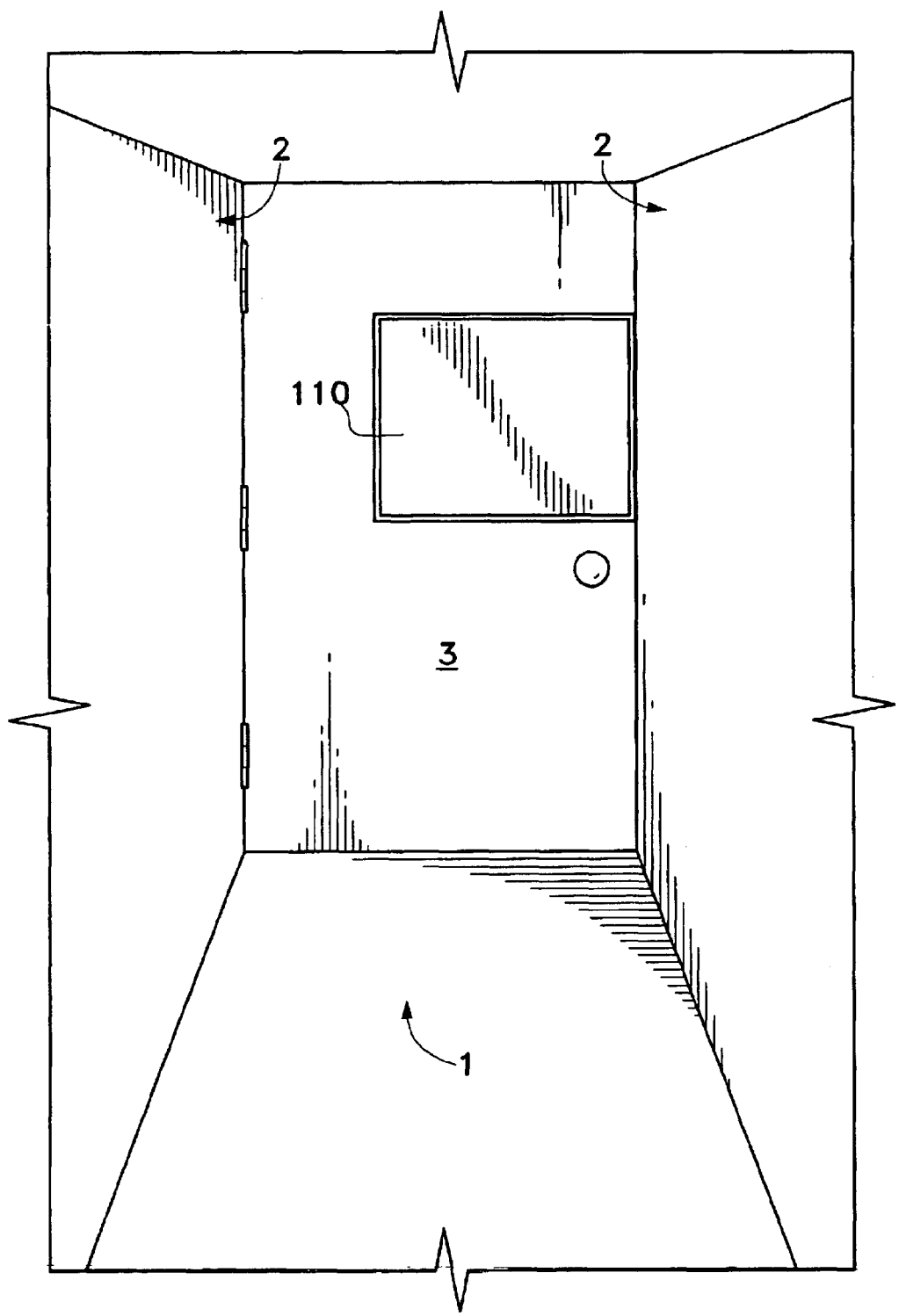
FIG. 3 depicts the vicinity around an exemplary ID read out antenna.

FIG. 3 mainly shows the ID tag read out antenna 110 that accompanies the tag read/write device 109 or local controller 112 according to the present invention.

The passage 1 includes a screen 3, such as a door, curtain, or a blind, and the ID tag read out antenna 110. The screen 3 is placed in the passage 1, which is surrounded by two wall surfaces 2, so as to screen the passage in the forward direction. The ID tag read out antenna 110 is attached to the passage-screening side of the screen 3.

In FIG. 3, the floor surface of the passage 1 is the exit of the stockroom in which apparel, jewelry, shoes, handbags, wallets, and other merchandise are stored, and the screen 3 serves to prevent customers from seeing the interior of the stockroom.

FIG. 4 shows a state in which a merchandise handler 5 wearing a personal ID tag 120 and carrying merchandise 6 to which merchandise control ID tags 121 are attached is moving down the passage 1 toward the screen 3 to which the ID tag read out antenna 110 is attached.

When the merchandise handler 5 attempts to proceed down the passage, he or she will run into the screen 3 and must move it. The merchandise handler 5 must bring his or her hands holding the merchandise 6 containing the merchandise control ID tag 121 close to the screen 3.

When this occurs, the personal ID tag 120 and the merchandise control ID tags 121 will be in sufficient proximity to the non-contact IC tag read out antenna 110 attached to the screen 3, and the personal ID tag 120 and the merchandise control ID tag 121 will be read on a non-contact basis.

The maximum distance between the ID tag read out antenna 110 and the personal ID tag 120 and the merchandise control ID tag 121, which are to be read, is determined by the shape of the article.

Figures 5, 6:
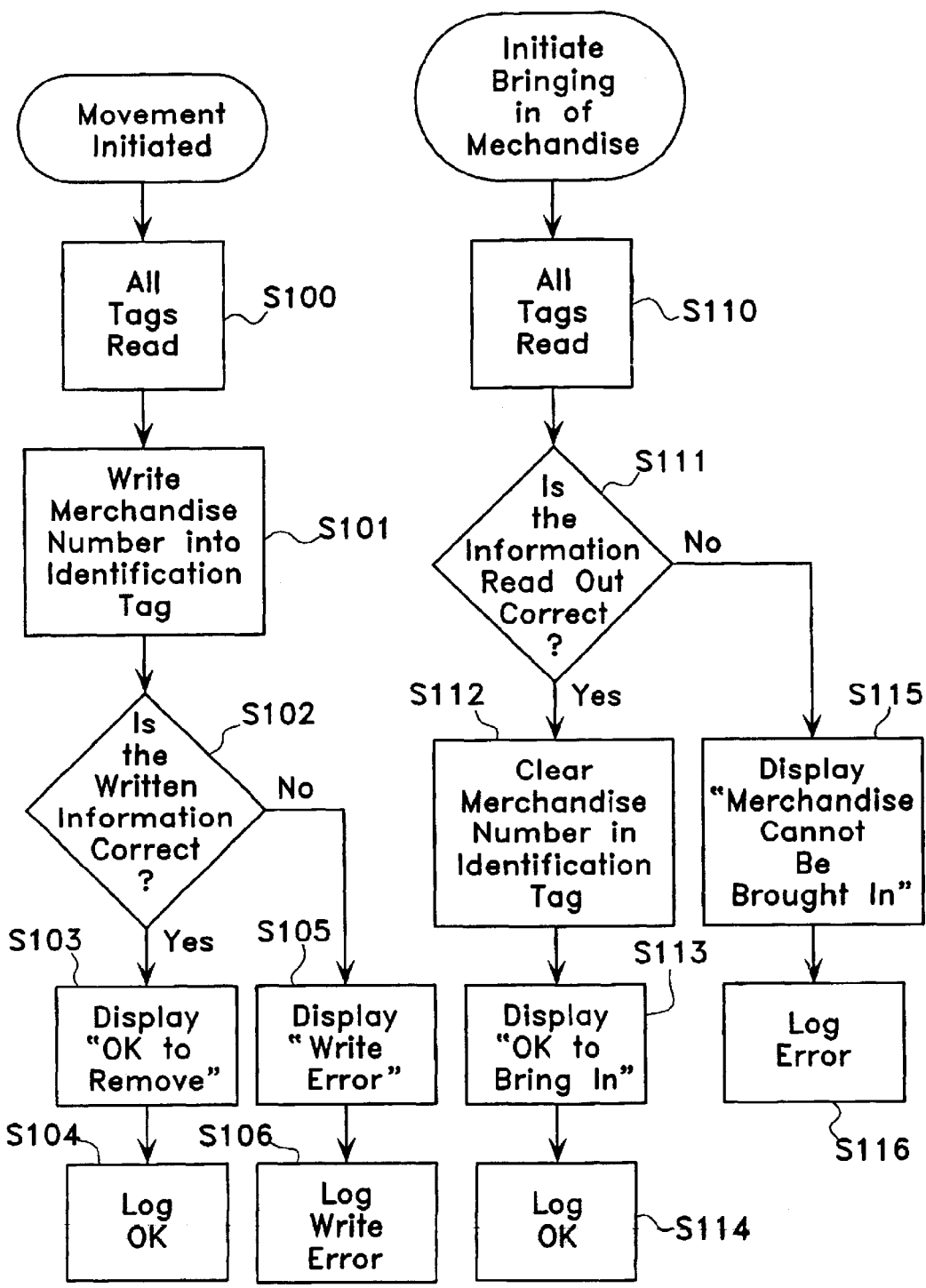
FIG. 5 is a flowchart describing a process that occurs when merchandise is being removed according to a first embodiment.
FIG. 6 is a flowchart describing a process that occurs when merchandise is being brought in according to the first embodiment.
Figure 7:
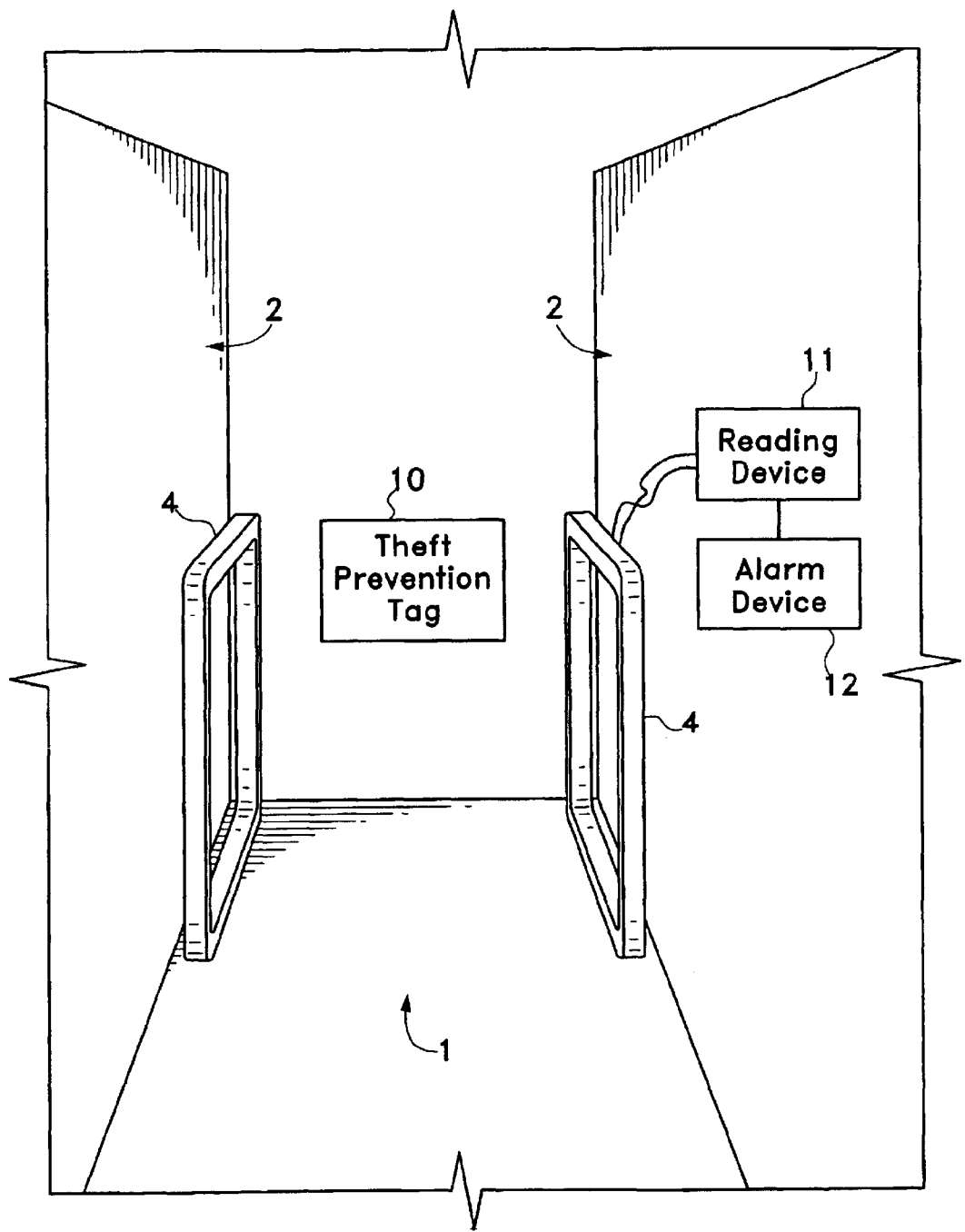
FIG. 7 depicts a conventional merchandise inventory management system.

Next, the details of the process of the controller 102 will be described based upon the flowcharts in FIG. 5 and FIG. 6. FIG. 5 is a flowchart showing the process of removing merchandise. First, when a handler 5 carrying merchandise comes close to the ID tag read out antenna 110, the personal ID tag 120 and the merchandise control ID tag 121 are all read (Step S100).

Next, the merchandise number of the merchandise control ID tag 121 read out is written into the personal ID tag 120 (Step S101). After that, a verification is performed in which the personal ID tag 120 is again read in order to determine whether or not it has been properly written into (Step S102).

If the results of the verification are normal, "OK to remove" will be displayed (Step S103), and an OK log made up of the time and date, the personal identification number, and the merchandise number will be stored in the data storage area 104 (Step S104).

In the event that a verification error is produced, "Write error" will be displayed (Step S105), and the time and date, the personal identification number read out from the personal ID tag 120, the merchandise number, and the merchandise number read out from the merchandise control ID tag 121 and from the personal ID tag 120 will be stored in the data storage area 104 (Step S106). In this case, the handler must confirm the removal of the merchandise using another method.

Next, the process of bringing in merchandise will be described based upon the flowchart of FIG. 6.

When the handler carrying the merchandise draws near the ID tag read out antenna 110, the personal identification number and the merchandise number are all read out from the personal ID tag 120 and the merchandise control ID tag 121 (Step S110).

Next, the merchandise number stored in the employee's personal ID tag 120 is verified against the merchandise number read out from the merchandise control ID tag 121 (Step S111). If they match, the merchandise number stored in the personal ID tag 120 is cleared (Step S112).

Next, "OK to bring in" will be displayed on the display panel 103 (Step S113), and the time and date, the personal identification number, and the merchandise number will be stored in the data storage area 104 (Step S114). In the event of a verification error, "Merchandise cannot be brought in" will be displayed on the display panel 103 (Step S115), the time and date, the personal identification number, the merchandise number actually read out from the merchandise control ID tag 121, and the merchandise number and the personal identification number read out from the personal ID will be stored in the data storage area 104 (Step S116), and confirmation of the merchandise to be brought in is conducted using another method.

Figure 2A:
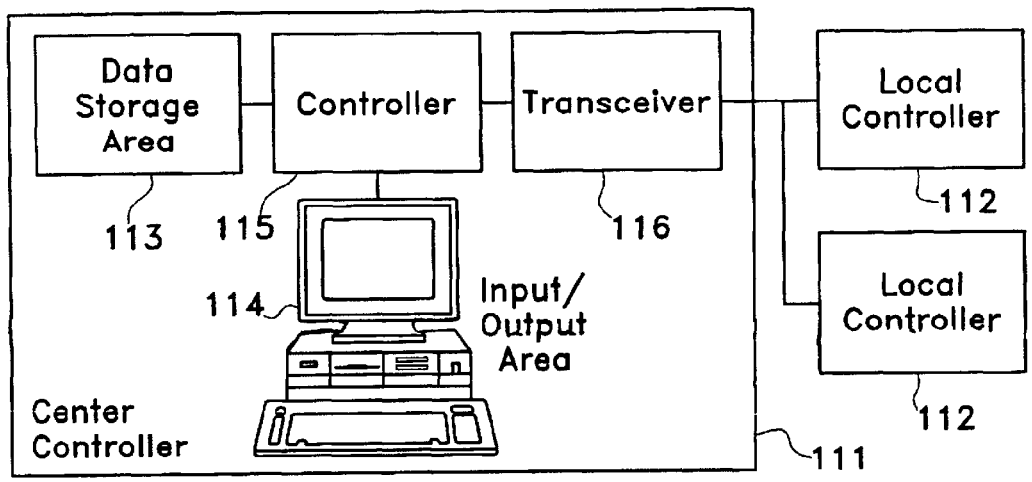
FIG. 2 shows the construction of a second embodiment of the merchandise inventory management system.

FIG. 2 shows the overall construction of a second embodiment of the present invention. A center controller 111 shown in FIG. 2(a) is a verification device that is connected to a local controller 112 disposed in a predetermined position. Normally, one of these will be placed in a store.

The local controller 112 is connected to an ID tag read out antenna 110, in order to read and write the employee number and the merchandise number from a personal ID tag 120 contained in the personal identification card being carried by the handler and a merchandise ID tag 121 that is attached to the merchandise, or contained inside or glued to its package.

Figure 2B:
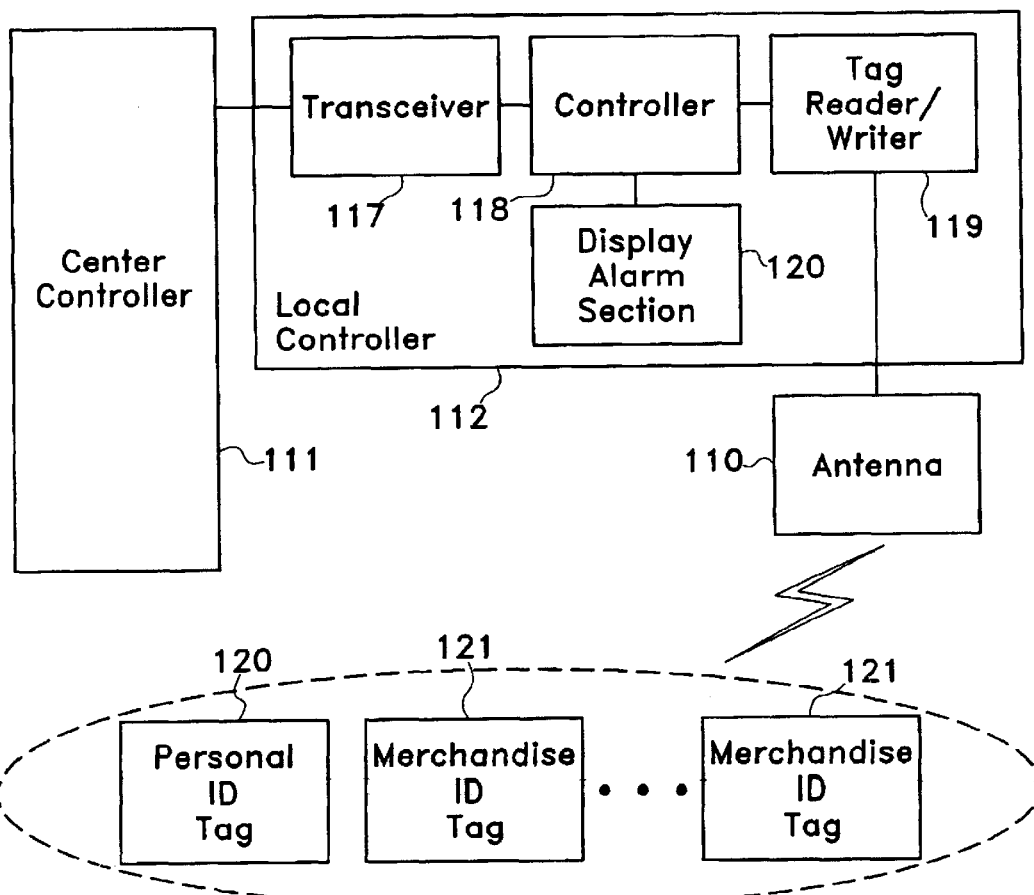

As shown in FIG. 2(b), this local controller 112 is provided to form a pair with the ID tag read out antenna 110.

The ID tag read out antenna 110 is placed at the entrance/exit of a room from which merchandise will be removed and at the entrance/exit of a location where merchandise it to be brought in, or at the entrance/exit of a stockroom, and installed inside an area that is controlled by the local controller 112.

At least the merchandise number that identifies the merchandise is stored in the ID tag 121 attached to the merchandise, or contained inside or glued to its package. In addition, a unique ID number is attached to the ID tag. For example, even in the event that a merchandise number or the like cannot be read out, the merchandise information (or product information) previously stored in the data storage area 113 can be extracted based on this number.

In addition, the identification card being carried by the employee is normally attached to his or her chest and contains the non-contact personal ID tag 120.

The local controller 112 simultaneously reads the merchandise control ID on the merchandise being carried by the employee and the non-contact ID tag 120 inside the identification card by means of the ID tag read out antenna 110. In this way, the merchandise information and the carrier can be associated with the data on where the merchandise was taken from.

A tag reader/writer 119 is a tag reading device for reading the non-contact personal ID tag 120 and/or the merchandise control ID tag 121. A controller 118 sends the employee number and the merchandise number that are read out, along with the number identifying the local controller 112, to the center controller 111 via a transceiver 117.

A display/alarm section 122 displays the completion of the reading of the personal ID tag 120 and the merchandise control ID tag 121, and alerts store employees by producing an alarm sound when the merchandise number that was recorded when the merchandise was being removed cannot be recognized when the merchandise is being brought in.

Next, the center controller 111 is comprised of a transceiver 116 that exchanges data with the local controllers 112 provided at multiple locations; a controller 115; a data storage area 113 that stores the read out IDs of the local controllers 112, the employees' personal ID numbers, and the merchandise ID numbers; and an input/output area 114 which allows a manager to see the current situation.

By operating the input/output area 114, the manager can identify the loss of merchandise and control the location of stock by confirming the movement of the merchandise at the end of the day or at fixed intervals.

Note that in the second embodiment, because the merchandise number of the merchandise that an employee removes can be stored in the data storage area 113 of the center controller 111, data verification can reliably take place even if the merchandise number of the merchandise to be removed is not held inside the personal ID tag 120.

The operation of the second embodiment will now be described. The process is approximately the same as the first embodiment. For example, in the event that merchandise is to be transported from stockroom A to stockroom B, both the merchandise control ID tag and the personal ID tag are first read at the exit of stockroom A, and then the merchandise number is written into the personal ID tag 120. Simultaneously therewith, the information read out is also sent to the center controller 111, and the ID of the local controller 112, the personal identification number, the merchandise number, and the date and time are registered in the data storage area 113. The fact that the information was properly registered is received by the local controller 112, and a completed registration is displayed by means of a lamp or the like provided on the display/alarm section 122.

Next, when the merchandise passes through the entrance of the stockroom B in which a local controller 112 has been installed, the merchandise number stored in the personal ID tag 120 and the merchandise number read out from the merchandise control ID tag 121 are verified. The employee number and the merchandise number are read out from the merchandise control ID tag 121 and the personal ID tag 120 are sent to the center controller 111, and the ID of the local controller 112, the personal identification number, the merchandise number, and the date and time, are registered in the data storage area 113.

Then, the personal identification number is retrieved, the most recent data on the merchandise that was removed is obtained, and all of the merchandise numbers now being read out are verified. The verification results are communicated to the applicable local controller 112, and if OK, the merchandise number area of the personal ID tag 120 is cleared, and a green lamp or the like provided on the display/alarm section 122 is turned on. In the event that there is an error, a buzzer, a red lamp, or the like will report the problem.

A manager can check to see if the merchandise number of the merchandise removed is the same as that of the merchandise being brought in by operating the input/output area 114 at any time. In addition, by operating the input/output area 114, the manager can confirm the current location of merchandise and determine how much merchandise is being handled by an employee with a given employee number.

Note that in a small-scale system, the center controller 111 may be composed of a personal computer.

As is clear from the foregoing description of the embodiments, with the merchandise inventory management system according to the present invention, the task of verifying the merchandise that one is attempting to move and recording the ID of the handler are not necessary because they are simultaneously and automatically recorded. Because of this, persons who remove merchandise can be identified, and thus the responsible person can be identified after the merchandise is removed. Because the merchandise control tag can themselves be used for theft prevention, additional theft prevention tags are not necessary.

I claim:

1. A merchandise inventory management system comprising a merchandise control ID tag that is attached to merchandise and stores said merchandise identification data, a personal ID tag that stores data that identifies an employee and has a storage area into which the aforementioned merchandise identification data can be written and from which said data can be read, a read/write device that reads data from and writes data into the aforementioned merchandise control ID tag and personal ID tag, and a verification device that verifies the merchandise identification data read out from the aforementioned merchandise control ID tag and personal ID tag by said read/write device;

wherein when said merchandise is being removed by said employee, the read/write device reads out merchandise identification data from said merchandise control ID tag and stores said merchandise identification data in said personal ID tag; and when said merchandise is subsequently being brought in by said employee, the read/write device reads out merchandise identification data from said merchandise control ID tag and also reads out merchandise identification data from said personal ID tag; and the verification device compares that merchandise identification data read out from the merchandise control ID tag with the merchandise identification data read out from said personal ID tag.

2. The merchandise inventory management system according to claim 1, wherein the merchandise control ID tag and the personal ID tag are non-contact wireless tags, and the read/write device is a device that wirelessly performs reading and writing.

3. The merchandise inventory management system according to claim 1, wherein the verification device has a storage device that stores the verification results.

4. The merchandise inventory management system according to claim 3, wherein the storage device stores the verification results as well as the merchandise identification data or the employee identification data, or both.

5. The merchandise inventory management system according to claim 1, wherein the merchandise control ID tag is a tag that is attached to apparel, shoes, handbags, wallets, or jewelry.

6. The merchandise inventory management system according to claim 1, wherein the personal ID is personal identification of an employee having access to a stockroom of a retail store for apparel, shoes, handbags, wallets, or jewelry.

7. The merchandise inventory management system according to claim 1, wherein merchandise identification data and a unique ID number are stored in the merchandise control ID tag.

* * * * *